(12) United States Patent
Davis et al.

(10) Patent No.: US 6,623,676 B1
(45) Date of Patent: Sep. 23, 2003

(54) PROCESS FOR FORMING A CONTINUOUS WEB FROM POLYURETHANE FOAM PIECES

(75) Inventors: Gregory B. Davis, Owings Mills, MD (US); Walter Greenhouse, Towson, MD (US); George Tolen, Ellicott City, MD (US)

(73) Assignee: Wm. T. Burnett & Co., Baltimore, MD (US)

( * ) Notice: Subject to any disclaimer, the term of this patent is extended or adjusted under 35 U.S.C. 154(b) by 0 days.

(21) Appl. No.: 09/353,449

(22) Filed: Jul. 14, 1999

(51) Int. Cl.$^7$ .......................... B29C 43/22; B29C 43/30
(52) U.S. Cl. ...................... 264/112; 264/123; 264/321; 264/916
(58) Field of Search ................ 264/916, 109, 264/321, 123, 112; 521/49

(56) References Cited

U.S. PATENT DOCUMENTS

| | | |
|---|---|---|
| 3,244,571 A | 4/1966 | Weisman |
| 3,370,117 A | 2/1968 | Blue |
| 3,709,966 A | 1/1973 | Gambardella |
| 3,746,610 A | 7/1973 | Hoegger |
| 3,790,422 A | 2/1974 | Jourquin |
| 3,793,414 A | 2/1974 | Buff et al. |
| 3,816,233 A | 6/1974 | Powers |
| 3,859,404 A | 1/1975 | Immel et al. |
| 4,167,612 A | 9/1979 | Tucker et al. |
| 4,173,505 A | 11/1979 | Jacobs |
| 4,241,189 A | 12/1980 | Sheldon et al. |
| 4,243,625 A * | 1/1981 | Burge ........................ 264/916 |
| 4,265,965 A | 5/1981 | Chancler |
| 4,302,272 A | 11/1981 | Phillips et al. |
| 4,328,368 A * | 5/1982 | Salloum et al. ............. 264/916 |
| 4,438,220 A | 3/1984 | Fracalossi et al. |
| 4,438,221 A | 3/1984 | Fracalossi et al. |
| 4,443,286 A | 4/1984 | Ikeda et al. |
| 4,458,034 A | 7/1984 | Fracalossi et al. |
| RE32,032 E | 11/1985 | Pettingell |
| 4,561,917 A | 12/1985 | Urai |
| 4,591,469 A | 5/1986 | Buchanan et al. |
| 4,595,551 A | 6/1986 | Maurer |
| 4,618,629 A | 10/1986 | Buchanan et al. |
| 4,666,646 A * | 5/1987 | Chang ........................ 264/916 |
| 4,683,246 A | 7/1987 | Davis et al. |
| 4,839,393 A | 6/1989 | Buchanan et al. |
| 5,045,389 A | 9/1991 | Campagna |
| 5,060,351 A | 10/1991 | Street |
| 5,185,380 A | 2/1993 | Diessel et al. |
| 5,204,040 A * | 4/1993 | Chang ........................ 264/916 |
| 5,286,321 A | 2/1994 | Fuss |
| 5,292,462 A * | 3/1994 | Nestle ........................ 264/109 |
| 5,418,257 A | 5/1995 | Weisman |
| 5,478,865 A | 12/1995 | Chang |
| 5,520,873 A | 5/1996 | Liene |
| 5,525,278 A | 6/1996 | Krosch et al. |
| 5,531,849 A | 7/1996 | Collins et al. |
| 5,532,050 A | 7/1996 | Brooks |
| 5,538,679 A | 7/1996 | Wagner et al. |
| 5,552,449 A | 9/1996 | Sollers et al. |
| 5,610,207 A * | 3/1997 | de Simone et al. ......... 264/123 |
| 5,643,517 A | 7/1997 | Wu |
| 5,736,585 A | 4/1998 | Meyer et al. |

OTHER PUBLICATIONS

"Standard Test Methods for Flexible Cellular Materials—Slab, Bonded, and Molded Urethane Foams", May 1995, ASTM Designation: D 3574–95, pp. 161–178.

White and Durocher, "Recycling of Rigid Polyurethane Articles and Reformation into a Variety of Polyurethane Applications", Sep./Oct. 1997, Journal of Cellular Plastics vol. 33, pp. 477–486.

* cited by examiner

*Primary Examiner*—Allan R. Kuhns
(74) *Attorney, Agent, or Firm*—Venable LLP; Michael A. Gollin; Chad C. Anderson

(57) ABSTRACT

A continuous process for reusing scrap polyurethane involves the following stages: Chips of thermoset polyurethane foam are supported as a bed; the bed of chips while moving is heated; the bed of chips while moving is subjected to pressure or compression; and a web is formed. The resulting material is useful in many industrial applications, including padding, gaskets, and insulation.

38 Claims, 2 Drawing Sheets

PROCESS FOR FORMING A CONTINUOUS WEB FROM POLYURETHANE FOAM PIECES

BACKGROUND OF THE INVENTION

The invention relates to a continuous process of using pieces of polyurethane foam to form webs of thermoset polyurethane. The invention involves manufacturing useful products such as carpet or flooring underlay, sound-deadening panels, packaging, and cushioning applications, from scrap materials.

Continuous and batch, or discontinuous, processes have been considered for salvaging virgin scrap and scrap recycle polymer. Generally, the processes have been rejected as commercially non-feasible, since most are time consuming, economically inefficient, and environmentally hazardous. For example, batch processes rely on molds, which are cumbersome, involve long cycle times; and produce single product sheets. Moreover, large metal molds or platens conduct heat in an inefficient manner, as in Diessel et al., U.S. Pat. No. 5,185,380. Conventional batch processes often rely on addition of binding agents to the scrap. Depending on the identity, the binding agents can present environmental hazards and can complicate processing. Prior continuous processes for salvaging scrap have some of the same disadvantages as batch processes.

A previous continuous process for compressing virgin polyurethane foam is described in Pettingell, U.S. Patent Re. 32,032 which used hot air suction and temperatures designed to preserve the integrity of the foam's cell structure. The circulating air would make the use of foam chips impractical (due to flying chips) and the use of temperatures above 365 degrees .F for more than 1 minute is said to char the foam. Col. 5, lines 52–54.

Efforts to heat and compress rigid, thermoplastic scrap foam by continuous process are described in U.S. Pat. No. 3,746,610. In the examples of the '610 patent, polyhydrocarbon (not polyurethane) foam flakes are heated only to tack temperature, compressed and then cooled to form a composite thermoplastic material. There remains a need for a process suitable for the use of incoming thermoset material and a resulting flexible, high density sheet (not a rigid, low density board), which are objectives that cannot be met by a melting and fusing process. Recycling thermoset scrap foam by batch processes is described in White and Durocher, "Recycling of Rigid Polyurethane Articles and Reformulation into a Variety of Polyurethane Applications," *Journal of Cellular Plastics* Volume 33, Sept./Oct 1997. The article refers to a glycolysis process, where glycol is added to rigid, thermoset scrap that has been heated sufficiently to break some urethane linkages to form a liquid that includes replacement polyol from glycol. This process produces recyclate polyols that can be mixed with virgin polyols to make rigid foams. The article notes the economic impracticality of glycolysis for flexible foam scrap and the established carpet underlay market for such scrap.

SUMMARY OF THE INVENTION

The invention relates to a continuous process for utilizing ground polyurethane foam and to products produced thereby. The result of the process is a continuous foam web or batting. The continuous process comprises providing chips of thermoset polyurethane to form a bed of chips on a continuously moving conveyor, subjecting the bed to heat; subjecting the bed to compression or pressure; and forming a continuous web of product having higher density than the bulk density of the chips.

Utilizing a continuous process that does not require additional chemicals that add cost and could pose environmental hazards, the invention provides increased speed and efficiency in the manufacture of compressed foam sheets of medium-to-high density from recycled thermoset a polyurethane foams such as polyester, polyether and blended foams. The properties of the resulting material (e.g. density, hardness, tensile strength) can be varied and the material may be laminated or fabricated, depending on customers' needs, and immediately rolled for storage and handling. According to the invention, chemical rebonding between chips of feed material occurs under easily controlled conditions of pressure and temperature not met in any of the prior art disclosures, and provides a more uniform integral product than prior composites.

The invention can be carried out in normal air, without special gases, and preferably employs conductive heating rather than forced air heating. Conductive heating is particularly advantageous with denser foams and thicker sheets.

According to the invention, temporary thermal depolymerization takes place before the material reforms into a coherent web. The process is characterized by conditions of temperature and pressure are effective to cause some isocyanate group regeneration by partial reversal of the polymer forming reactions. It is noted that, during heating, polyol regeneration may also result from polyurethanes produced from polyols. The invention relies on the heat and compression to effect that regeneration of polyol (polyether or polyester) and/or isocyanate groups, via partial reversal of the polymer forming reactions, rather than the independent addition of reagents to the dry chips of thermoset polyurethane. That regeneration results, in turn, in a chemical bonding reaction between the regenerated isocyanate groups and the heated thermoset polyurethane.

The invention does not require addition of binders, adhesives or reagents to the bed of chips; moreover, it does not require lubricants or mold release agents. Accordingly, the continuous web production can be viewed as "comprising", as "consisting essentially of" or as "consisting of" the process herein described.

The products can be used for manufacture of carpet or flooring underlay, sound deadening panels, gaskets and seals, and in packaging and cushioning applications. The web product can be fabricated or laminated with additional laminates. For example, laminate sandwiches can be formed with thinly peeled virgin polyurethane foam or polyethylene coated paper or other material, both of which mask the sometime multi-color appearance of the rebonded scrap foam and provide a smooth surface to the sheet. Modification of the product is contemplated through the addition of other additives that will yield desired properties, including for example carnauba or other waxes in an amount up to 5% by weight for the purpose of improving the moisture resistant properties of a continuous foam sheet.

Further objectives and advantages will become apparent from a consideration of the description, drawings, and examples.

BRIEF DESCRIPTION OF THE DRAWINGS

The invention is better understood by reading the following detailed description with reference to the accompanying figures, in which like reference numerals refer to like elements throughout, and in which.

DETAILED DESCRIPTION OF THE PREFERRED EMBODIMENTS

Figure 1:
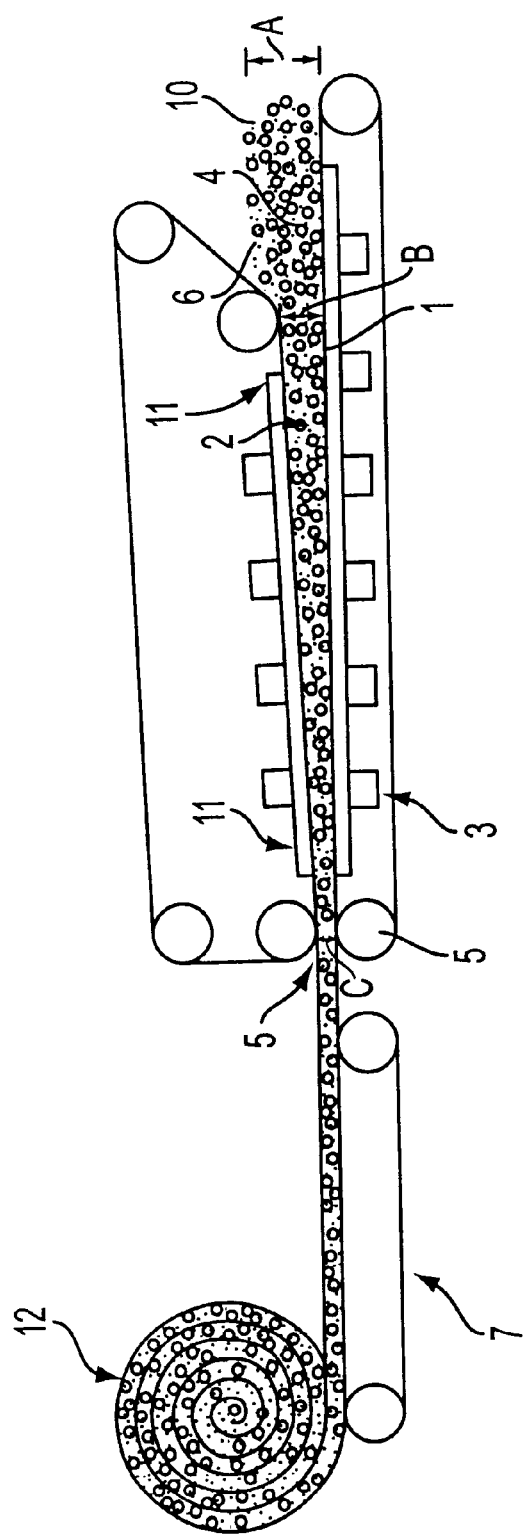
FIG. 1 shows a schematic cross-section of an apparatus used to carry out the method of the invention.

In describing preferred embodiments of the present invention illustrated in the drawings, specific terminology is employed for the sake of clarity. However, the invention is not intended to be limited to the specific terminology so selected. It is to be understood that each specific element includes all technical equivalents which operate in a similar manner to accomplish a similar purpose. Each reference cited here is incorporated by reference as if each were individually incorporated by reference. The term "a" is intended to mean at least one unless the context indicates otherwise.

In accordance with the invention, chips of any size including dust, of thermoset polyurethane are fed to a conveyor. The word "chips" is used to mean flakes, granules, shreds, particles, or other pieces of foam. Scrap recycle or virgin scrap polyurethane foam can be peeled into thin sheets, shredded or comminuted. Thermoset poyurethane scrap foam of any porosity, density, resiliency or load bearing characteristics from virtually any source will give essentially similar results. Some decrease in tensile strength and abrasion resistance is expected when scrap has been shredded or pulverized to the point of destroying the scrap foam's cell structure.

One means or apparatus for comminution includes high speed rotating blades or knives. In such a set up, longer comminution times result in decreased particle size. The exact dimensions are not critical. For example, in a laboratory environment, foam chips approximately $1/8$" in diameter and 1" in height move through the heating/compression zone at a rate of 2 feet/minute and require 2 to 2 ½minutes at temperatures of approximately 425 F. for sufficient bonding to occur.

The process of the invention involves the following stages: Chips are supported as a bed; the bed of chips is heated; the bed of chips is subjected to pressure or compression; and a web or batting is formed. The order of heating and compression is not critical. Accordingly, heating may be conducted prior to or simultaneously with compression, or subsequent to compression. The critical aspect of the process is subjecting the bed of chips to conditions, solely attributable to heating and compression, which are effective to regenerate isocyanate groups, polyol or admixtures thereof from the thermoset polyurethane. The source of heating is not critical and heating can be by thermal, dielectric, microwave, steam, or other means. Heating may be uniform or may rise from the entrance into the exit of the heated zone.

In one embodiment of the continuous process of the invention, the chips are disposed on a conveyor formed of a material which is releasable from the bed and ultimate web; the chips are heated thereon; are compressed; and product is advanced to a stage for handling.

A device shown in FIG. 1 includes a heated, moving conveyor 1 of solid construction, with a second heated conveyor 2 above it angled toward the bottom conveyor 1 and moving at approximately the same speed. Heaters 3 heat the conveyors. Foam chips 10 with various surface areas are laid down on the bottom conveyor 1 in a bed of relatively even and uniform distribution to prevent bulges in the finished sheet that would otherwise be caused by uneven compaction or heat penetration. The conveyors do not react with the bed and the bed can be stripped from them. A non-stick coating such as Teflon may be desirable. The chips 10 are compacted and held in place upon entrance between the two conveyors at entrance 4 region by the upper conveyor 2 that is designed to approach the bottom conveyor at an angle in angled portion 6. The chips are heated (typically between 400 degrees and 450 degrees F.) in a heating and compressing zone 11 as they are held in close proximity by the upper and lower conveyors 1 and 2 until they exit through a pair of nip rollers 5. The nip rollers 5 can provide the final compression that further intertwines the foam chips and cross-links the polymer chains comprising the foam chips. The nip rollers 5 can bring the compressed sheet to its final, desired thickness. After passing through the nip rollers 5, the compressed foam sheet can be conveyed to cooling conveyor 7 where it may be air cooled and can then be rolled up as a coiled web 12 e.g. on a storage roller for ease of handling and storage.

Variation in lay down quantity of polyester urethane, polyether urethane or blended foams thereof and nip roller pressure provide the flexibility to alter the properties of the sheet including density, hardness and tensile strength, as required. The resulting product, foam web, will generally exhibit bulk densities in the range of from about 4 to 70 pounds per cubic foot and thicknesses of from about 0.05 to 2 inches.

The conveyor speed can be varied to obtain a dwell time that yields a sufficient bond between the particles. For example, foam chips approximately $1/8$" in diameter, in a bed 1" in depth, move through the heating/compression zone at a rate of 2 ft./minute and require heating for between 2 and 2 ½minutes at about 450° F. for sufficient chemical rebonding to occur.

Any suitable method may be employed for depositing a bed of thermoset polyurethane foam chips on the bottom conveyor of a machine for heating and compressing so that the top and bottom sides of the chips have preferably little undulation. It is not critical in what manner and order thermoset polyurethane foam chips are, in a continuous process, stabilized, compressed and heated to temperatures that, in combination with compression, will cause the chemical reaction heretofore described, and similar results may be achieved e.g. where scrap is first compressed without heat and then heated under compression.

Three thicknesses that are important to the practice of the invention are (A) the thickness of the feed material, (B) the gap between the conveyors in the heating zone, and (C) the final gap. The relationship between these thicknesses may be stated as $A \geq B \geq C$. Preferably, $A>B>C$. That is, the feed material is compressed upon entry into the heating zone, and the heated material is further compressed in the final gap; e.g. between the nip rollers. The final product typically recovers (expands) slightly due to elasticity upon exiting the nip rollers, and contracts slightly upon cooling, so that the final thickness is comparable to the final gap.

The final gap is preferably defined by two nip rollers, which may be along the same conveyor belt as the heaters. Alternatively, compression can be provided by the conveyors themselves, a pair of separate nip rollers, a bulkhead or other suitable gap-defining structure through which the heated bed can pass without disruption. The term "nip rollers" is used throughout here, but any of these other alternatives is contemplated therein, as well as other adjustable compression devices as may be apparent to a person of ordinary skill. As used here, conveyor means a conveyor belt on rollers, closely spaced rollers, or any other suitable device or arrangement for moving the bed intact with minimal friction.

As a practical matter, the thickness of the feed material mass is likely to be in the range of about 1" to about 10", although thinner and thicker feeds are feasible depending on the foam density, arrangement of the entrance zone to the heating zone and other characteristics. The ratio of thickness A to thickness C may be in the range of about 65:1 for a highly compressed elastomeric product, about 10:1 for typical scrap salvage products having a density of 10 to 20 pounds per cubic foot, and almost as low as 1:1 for very slightly compressed material.

The feed material is, generally speaking, polyurethane foam. All types of thermoset polyurethane foam are suitable, as an important aspect of the invention is believed to be the rebonding of diisocyanate linkages under the continuous heat and pressure treatment of the invention, as described below. Generally, the thermoset polyurethane has been formed from reaction mixtures comprising isocyanates, including polyisocyanates and polyols, crosslinking agents, surfactants, catalyst(s) and other ingredients, although the invention applies to any suitable thermoset polymer having the same susceptibility to rebonding under the conditions of compression and heating as discussed here. Other materials, though not necessary to obtain the advantages of the invention, may optionally be included as desired to obtain particular end products. For example, fibers, rubber, minerals, wax, and other materials can be mixed in with the polyurethane foam in minor quantities that do not adversely affect the strength and integrity of the end product. Preferably, the feed material and hence the end product, is essentially free of reagents, binders, pre-polymers, adhesives, or lubricants.

Laminated sheets may also be added to one or both sides of the foam chip feed. The composition of the lamina may be the same or different as the foam chips, and may be polymer, fabric, paper, metal foil, or any other continuous sheet or mesh material.

The feed material is a plurality of chips or pieces of foam which may be of uniform or non-uniform size and shape. For example particles with a dimension as low as about 1/16" and particles with a dimension as high as several inches have been used successfully. The density of the feed material may be virtually any density available, so long as the chip to chip density and packing provides enough surface to surface contact for the rebonding process of the invention to produce a continuous product with sufficient tensile strength. The higher the feed material density, and the more it is compressed, or the more material compressed to the same thickness, the higher the end product density.

Greater uniformity of the feed pieces tends to increase the uniformity of the density of the feed material mass fed into the heater/compressor apparatus, and thus the evenness of density and smoothness of the surface of the end product. In some applications, an end product with less uniform density or even surface may be acceptable or desirable, and may be achieved depending on the feed material mass and distribution that is used.

The temperatures given in the experiments reported here are the conveyor belt temperatures, which are related, but indirectly, to the temperature achieved by the feed material, which is the effective or activation temperature for producing chemical rebonding according to the invention. The effective temperature of the feed material depends not only on the conveyor temperature, but also on the dwell times, the density, and thickness of the feed material. At conveyor temperatures below about 350° the activation temperature cannot be reached. At heater temperatures above 525° the polyurethane degrades too quickly. At temperatures between about 350° and about 525°, feed material thickness and density and the dwell time (a function of conveyor length and speed), heater zone gap, and nip roller gap can be adjusted to achieve the rebonded foam products of the invention. Under the conditions employed in the examples, the conveyor temperature is between about 380° and about 500° and more preferably between about 400° and about 450° Fahrenheit.

The term pressure is used here in relation to the compressive force applied to the feed material in the nip roller gap, and to a smaller extent in the heating zone. The compressive force influences the degree of packing and thus of bonding between separate particles.

Upon leaving the nip rollers, the end product typically enters a room temperature environment and cools passively, which is an economical and effective way to practice the invention. Alternatively, the web could be cooled more actively, or even maintained at elevated temperature for further processing. The post-nip conditions are not critical to the inventive process. Desirably, the web is conveyed to a storage roller where it is coiled to provide a useful and readily transported article of manufacture.

The range of densities of the product may be from about 4 to about 70 pounds per cubic foot, preferably about 8 to about 50, more preferably about 10 to about 30 pounds per cubic foot. A desirable density of the end product is in the 10 to 20 pounds per cubic foot range, but some applications may call for stiffer, usually higher density products with density of 30 pcf or higher up to the elastomeric limit of polyurethane (usually about 65 pcf).

Figure 2:
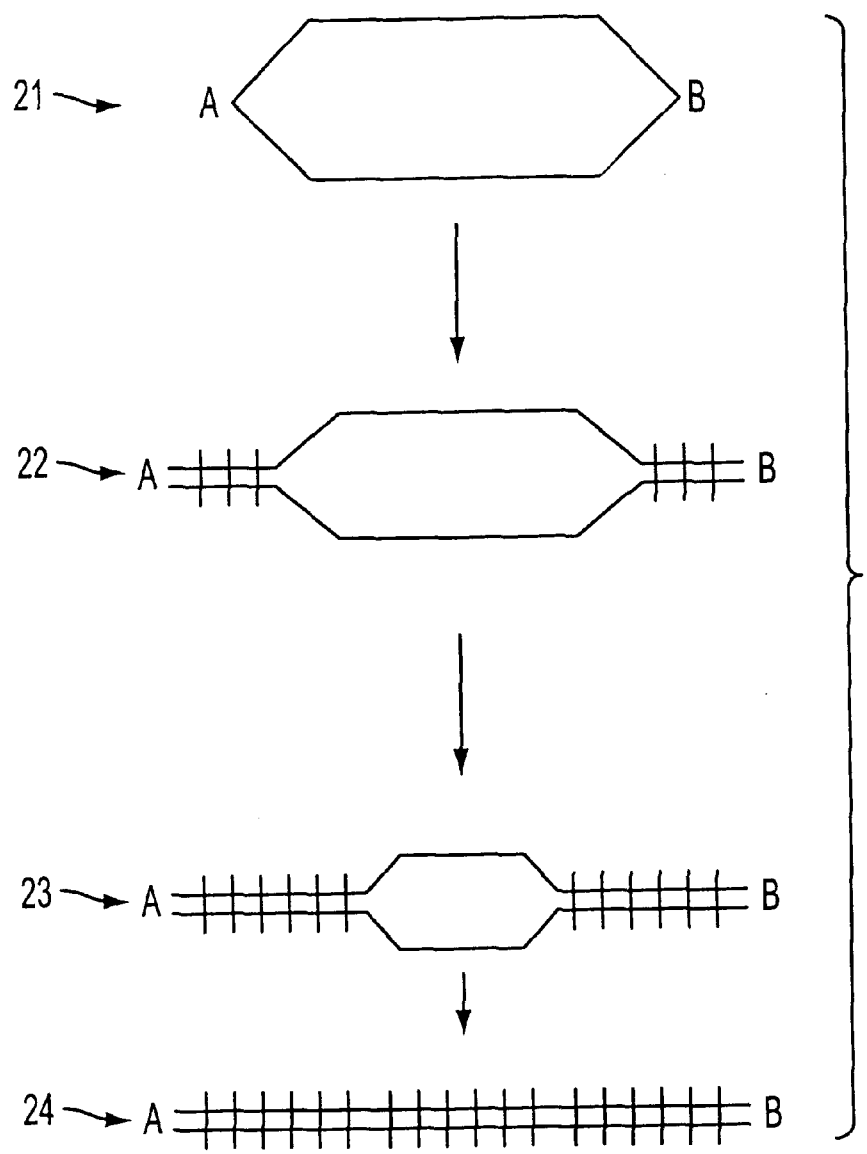
FIG. 2 is a flow chart showing the hypothetical effect of increasing temperature and pressure on the cellular structure of polyurethane foam according to the invention.

Without intending to be limited by the following explanation, it appears that a chemical reaction occurs at the surface of the thermoset polyurethane strand, rather than a thermal glass transition as takes place with thermoplastic polymers. The chemical bonds at the diisocyanate moiety (and possibly polyol bonds) are presumably breaking and reforming under the influence of heat and pressure. The reformation of bonds can take place both within the polyurethane matrix of a strand, and across surfaces of different strands (in different pieces) pressed into intimate contact. A theoretical flow chart of this process is provided in FIG. 2. When the bulk density of the mass of foam particles is low (21) a cross-section of a normal cell shows points A and B at the ends of an open cell. As the temperature is increased to the activation point, and the bulk density of the foam mass is increased (22), rebonding begins to take place adjacent to points A and B, and the cell flattens somewhat. As more compression and heat is applied (23), the amount of rebonding increases. At the extreme of compression and heat applied, the cell structure is completely lost (24) and the density of the pad is the highest. The strength of bonding increases from situation (21) through situation (24).

In high throughput production, a heater/compressor apparatus may have any desirable width, and the length and speed of the heating conveyors, the placement of the heaters, and the gap between the conveyors, and the final gap between e.g. nip roller, may all be optimized based on the principles of the invention described here and using skills in the possession of the person of ordinary skill in the art. The orientation of the conveyor assembly is preferably horizontal but could be vertical without loss of the benefits of the invention. For example, material could be gravity fed into the entrance area of the conveyor, and conveyed downward through the heating zone, with the final gap at the bottom of the oven.

EXAMPLES

Pads were made from chips of thermoset polyurethane foam in a specially adapted Astechnology 5200 Continuous Fusing Machine. The foam type was mostly ester from a production shredder pile, although similar results are obtained from ethers and blends. The bulk density of the feed material was 1.83 pcf.

Five pads were produced under conditions shown in Table 1, and with the characteristics listed there. Pads 1 and 2 were unlaminated. For pads 3–5, a bed of shredded scrap was sandwiched between two 0.062" prime polyester foam sheets.

The firmness or compression force deflection (CFD) of the end product was tested by ASTM D3574 test C, incorporated herein by reference. A gauge is driven in 25% of the original product thickness and the return force is measured after 1 minute. The gauge is then driven further to 65% of the original product thickness and the return force is measured after 1 minute.

TABLE 1

Compressed scrap foam pads

| Pad # | Temp. (° F.) | original thickness (inches) | avg. final thickness (inches) | density (pcf) | Firmness CFD (psi) 25% | Firmness CFD (psi) 65% | Support Factor (65%/25%) | lamination strength |
|---|---|---|---|---|---|---|---|---|
| 1 | 450 | 2.5 | 0.340 | 12.6 | 4.24 | 56.19 | 13.25 | NA |
| 2 | 450 | 3.0 | 0.290 | 17.1 | 5.25 | 69.81 | 13.29 | NA |
| 3* | 450 | 3.0 | 0.290 | 17.2 | 5.57 | 78.35 | 14.07 | excellent |
| 4* | 400 | 3.0 | 0.405 | 12.3 | 3.85 | 43.20 | 11.22 | excellent |
| 5* | 450 | 3.0 | 0.339 | 19.5 | 10.1 | >150 | >14.8 | excellent |

The embodiments illustrated and discussed in this specification are intended only to teach those skilled in the art the best way known to the inventors to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described.

What is claimed is:

1. A continuous method for forming a web comprising:
   forming a bed of chips of thermoset polyurethane foam,
   heating the bed,
   compressing the bed, and
   conveying the bed during heating to control the heating time and during compressing to provide compressive force, the heating and compressing causing the chips to bond and form a web,
   wherein the compressing is undertaken at a time being at least one of a) simultaneously with the heating and b) prior to the heating.

2. The process of claim 1, wherein the compressing step comprises advancing the bed of chips to a heating zone with two opposed conveyors spaced apart less than or equal to the thickness of the bed of chips and moving at approximately the same speed.

3. The process of claim 2, wherein the compressing step comprises advancing the bed of chips from the heating zone to a final gap spaced narrower than the gap spacing between the two opposed conveyors in the heating zone.

4. The process of claim 2, comprising heating the bed in the heating zone with heaters disposed along the opposed conveyors.

5. The process of claim 2, wherein the opposed conveyors are at a temperature in the range of about 350° F. to about 525° F.

6. The process of claim 2, wherein the opposed conveyors are at a temperature in the range of about 390° F. to about 450° F.

7. The method of claim 3, wherein the compressive force comprises the force exerted by the two opposed conveyors.

8. The method of claim 1, wherein the bed in the forming step and the web in the conveying step each have a thickness, and wherein the ratio of the thickness of the bed in the forming step and the thickness of the web subsequent to the conveying step ranges from about 65:1 to above about 1:1.

9. The method of claim 8, wherein the thickness ratio ranges from about 10:1 to above about 1:1.

10. The method of claim 8, wherein the thickness ratio is about 8:1 to about 7:1.

11. The method of claim 8, wherein the thickness ratio is about 9:1 to about 8:1.

12. The process of claim 1, wherein the bed has a density after compressing in the range of about 8 to about 50 pounds per cubic foot.

13. The process of claim 1, wherein the bed has a density after compressing in the range of about 10 to about 30 pounds per cubic foot.

14. The process of claim 1, wherein the bed has a density after compressing in the range of about 10 to about 20 pounds per cubic foot.

15. The process of claim 1, wherein the bed has a density after compressing less than about 50 pounds per cubic foot.

16. The process of claim 1, wherein the bed has a density after compressing in the range of about 30 to about 65 pounds per cubic foot.

17. The process of claim 1, wherein the bed has a density after compressing in the range of about 4 to about 70 pounds per cubic foot.

18. The process of claim 1, wherein the bed has a density after compressing in the range of about 12 to about 20 pounds per cubic foot.

19. The process of claim 1, wherein the bed has a thickness after compressing in the range of about 0.05 inches to about 2 inches.

20. The process of claim 1, wherein the bed has a thickness after compressing in the range of about 0.3 inches to about 4 inches.

21. A continuous method for forming a web comprising:

forming a bed of chips of thermoset polyurethane foam, heating the bed, compressing the bed, and conveying the bed during heating to control the heating time and during compressing to provide compressive force, the heating and compressing causing the chips to bond and form a web, wherein the compressing step comprises advancing the bed of chips to a heating zone with two opposed conveyors spaced apart less than or equal to the thickness of the bed of chips and moving at approximately the same speed, and wherein the heating zone has a first opening tapering to a smaller second opening.

22. A continuous method for forming a web comprising:

forming a bed of chips of thermoset polyurethane foam, heating the bed, compressing the bed, conveying the bed during heating to control the heating time and during compressing to provide compressive force, the heating and compressing causing the chips to bond and form a web, and applying a sheet of material over and/or under the bed of chips and forming a laminated web having at least two plies.

23. A continuous process for forming a web of foamed polyurethane, comprising:

disposing chips of thermoset polyurethane foam onto a moving conveyor to form a bed of chips; and heating the bed of chips;

subjecting the bed of chips to compression by advancing the bed to means for compressing, wherein said heating and said compression provide conditions effective to cause the polyurethane to react with itself, producing a product web of thermoset polyurethane foam which exhibits a final density greater than the bulk density of the bed of chips prior to heating; and wherein the subjecting the bed to compression is undertaken at a time being at least one of a) simultaneous with the heating and b) prior to the heating.

24. The process of claim 23, which further includes compacting the bed of chips.

25. The process of claim 23, wherein the heating is conducted at a temperature between about 350° and 525° F.

26. The process of claim 23, which comprises air cooling the product web.

27. The process of claim 23, which comprises feeding the bed to a means for adjusting final thickness.

28. The process of claim 23, wherein the product web is cooled on said conveyor.

29. The process of claim 27, wherein feeding the bed comprises advancing it on the conveyor through nip rollers.

30. The process of claim 23, wherein said product web is advanced on said conveyor to a zone in which the product web is cooled.

31. The process of claim 23, further comprising heating said bed continuously during compression.

32. The process of claim 23, wherein said heating is undertaken prior to said compression.

33. The process of claim 23, wherein heating and compression are undertaken simultaneously.

34. The process of claim 23, wherein compression is undertaken prior to heating.

35. The process of claim 23, comprising compressing the chips prior to heating and final compression.

36. A continuous method for forming a web comprising:

forming a bed of chips of thermoset polyurethane foam, heating the bed, compressing the bed, and conveying the bed during heating to control the heating time and during compressing to provide compressive force, the heating and compressing causing the chips to bond and form a web, wherein the compressing step comprises advancing the bed of chips to a heating zone with two opposed conveyors spaced apart less than or equal to the thickness of the bed of chips and moving at approximately the same speed, and wherein the two opposed conveyors define a first opening tapering down to define a second opening.

37. A continuous method for forming a web comprising:

forming a bed of chips of thermoset polyurethane foam, heating the bed, compressing the bed, and conveying the bed during heating to control the heating time and during compressing to provide compressive force, the heating and compressing causing the chips to bond and form a web, wherein the compressing step comprises advancing the bed of chips to a heating zone with two opposed conveyors spaced apart less than or equal to the thickness of the bed of chips and moving at approximately the same speed, wherein the compressing step comprises advancing the bed of chips from the heating zone to a final gap spaced narrower than the gap spacing between the two opposed conveyors in the heating zone, and wherein the compressive force comprises the force exerted by the two opposed conveyors and is less than 10 psi.

38. A continuous method for forming a web comprising:

forming a bed of chips of thermoset polyurethane foam, heating the bed, compressing the bed, and conveying the bed during heating to control the heating time and during compressing to provide compressive force, the heating and compressing causing the chips to bond and form a web, and wherein said heating is undertaken during and after compressing.

* * * * *